UNITED STATES PATENT OFFICE.

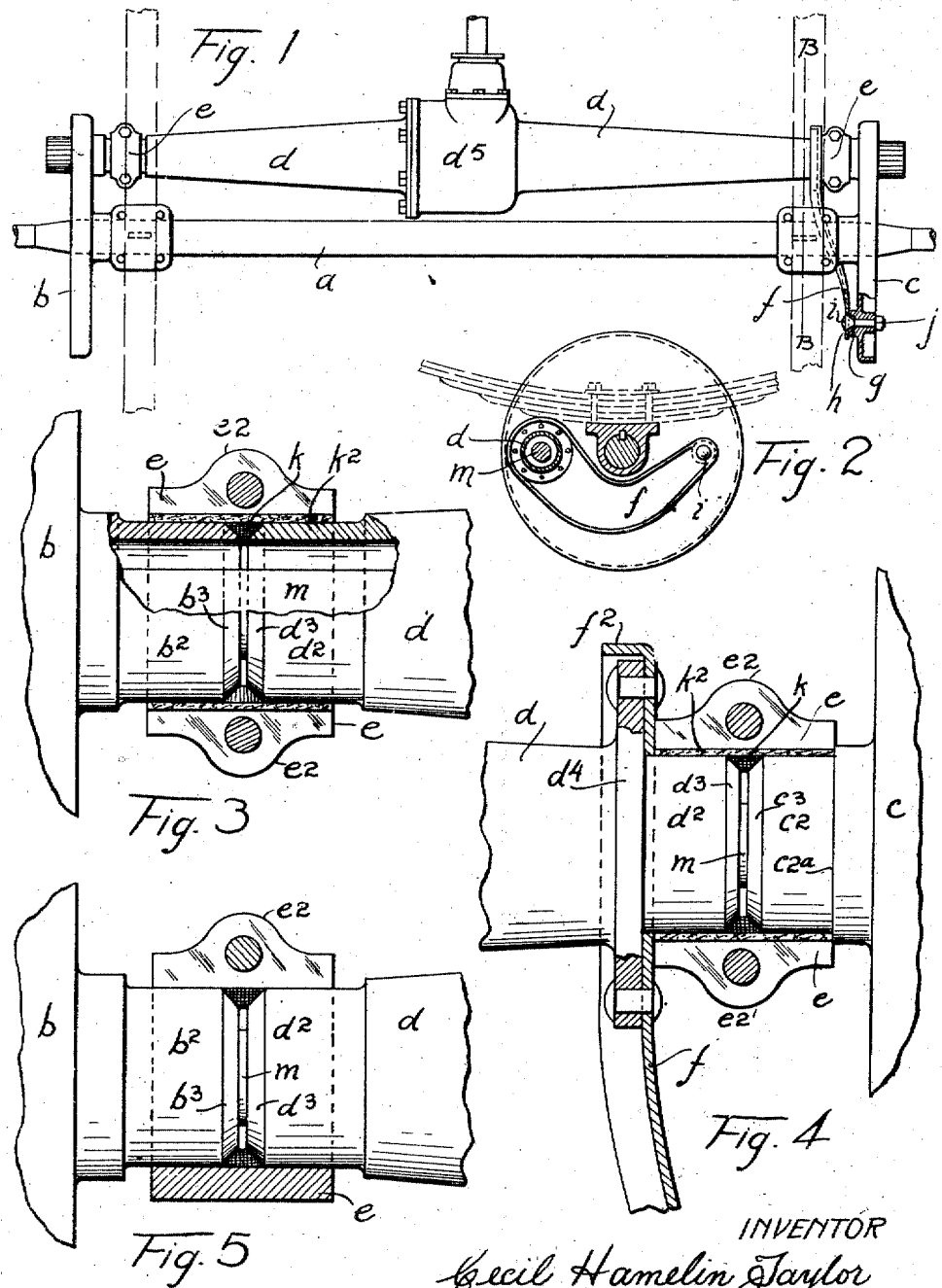

HAMELIN TAYLOR, OF DETROIT, MICHIGAN.

TRANSMISSION-GEARING FOR AUTOMOBILES.

1,255,665.

Specification of Letters Patent.

Patented Feb. 5, 1918.

Application filed June 8, 1916. Serial No. 102,370.

*To all whom it may concern:*

Be it known that I, CECIL HAMELIN TAYLOR, a citizen of the United States, residing at Detroit, county of Wayne, State of Michigan, have invented a certain new and useful Improvement in Transmission-Gearing for Automobiles, and declare the following to be a full, clear, and exact description of the same, such as will enable others skilled in the art to which it pertains to make and use the same, reference being had to the accompanying drawings, which form a part of this specification.

My invention relates to transmission gearing for automobiles and objects of my improvements are to provide an improved transmission gearing and one in which strength, simplicity, flexibility, and accessibility, shall be attained, the leakage of oil prevented and the dust excluded.

I secure these objects in the apparatus illustrated in the accompanying drawings in which, Figure 1 is a plan view of the axle beam, jack-shaft casing and adjacent parts.

Fig. 2 is a section on the line B—B Fig. 1 looking from the left of said line.

Fig. 3 is a detail plan view partly broken away to show the interior construction of the left hand end of the jack-shaft, as shown in Fig. 1, and adjacent parts.

Fig. 4 is a similar view to Fig. 3 showing the right hand end of the jack-shaft and adjacent parts.

Fig. 5 is a view similar to Fig. 3 showing a modified construction.

$a$ is the load-carrying axle beam; $b$ and $c$ are end brackets, secured to the axle $a$ and carrying the springs secured in the usual way on the sleeves integral with said brackets. $d$ is the casing for the counter shaft. This casing is intended to contain lubricating material.

$e$ is a clamping ring having clamping lugs $e^2$ thereon according to the usual construction. $f$ is a torque arm secured to the casing $d$ at one end and at the other fastened to the web of the bracket $c$. $g$ is a socket in the web of the bracket $c$ into which fits a hollow conical projection or lug $h$ struck up and extending from the arm $f$. A bolt $j$ having a conical head $i$ fits in the hollow of the conical projection $g$ and passes through an aperture in the web of the bracket $c$ and is secured in place by a nut in the usual way to secure the outer end of the torque arm $f$.

$m$ is the jack-shaft within the casing $d$.

Referring particularly to Fig. 4, $d^4$ is a flange turned up around the outer edge of the casing $d$. The arm $f$ has a flange $f^2$ at its edge which fits over the flange $d^4$ and the arm is riveted to said flange. $c^2$ is a cylindrical extension from the bracket $c$, this surrounds the counter shaft $m$ and is provided with a shoulder $c^{2a}$. The inner edge of the extension $c^2$ is chamfered off as shown at $c^3$. $d^2$ is a cylindrical extension from the shaft casing $d$ axially in line with the extension $c^2$ and having its adjacent edge chamfered off at $d^3$. $k$ is a ring of packing material resting upon the surfaces of the chamfered edges $d^3$ and $c^3$. $k^2$ is a packing material which may surround the extensions $d^2$ and $c^2$. $e$ is a clamping ring placed around the extensions $c^2$ and $d^2$ outside of the packing material, $k^2$, if such is provided, and clamped by bolts extending through apertures in ears $e^2$ in the usual way. This forces the packing material $k$ tightly against the surfaces of the chamfered ends of the extensions $c^2$ and $d^2$ and also rests against the packing material $k^2$. This forms an oil tight joint while permitting some flexibility of the casing $d$ relative to the bracket $c$ to which it is secured.

An analogous construction shown in Fig. 3 is at the left of the jack-shaft casing as shown in Fig. 1. A single pair of ears $e^2$ may be used for securing the clamping ring $e$ and packing material $k^2$ may be omitted, as shown in Fig. 5.

Figure 7:
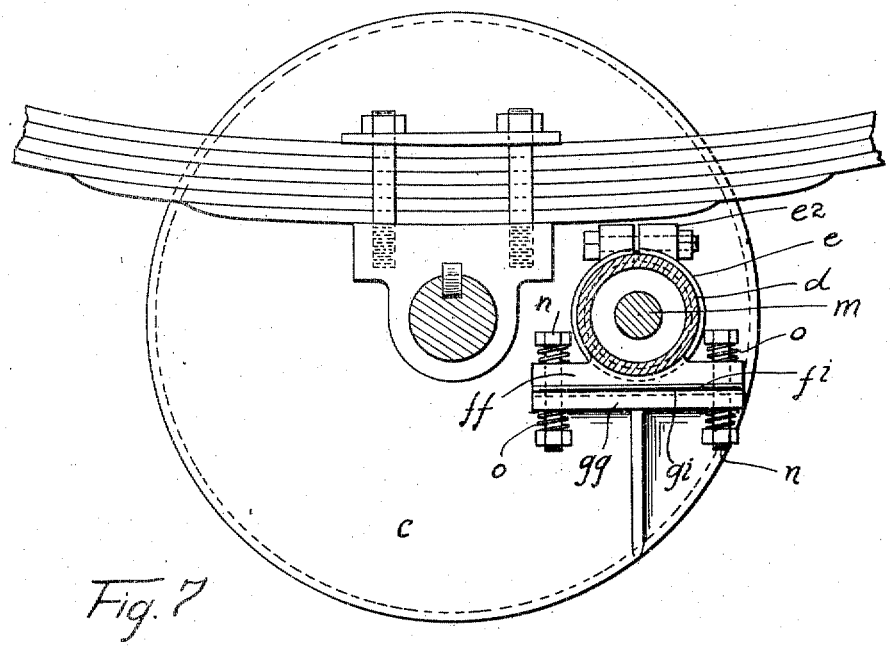
Figs. 6 and 7 show detail elevations in planes at right angles to each other, the latter being partly in section, of a modified construction of the parts at the right of Fig. 1.
Figure 6:
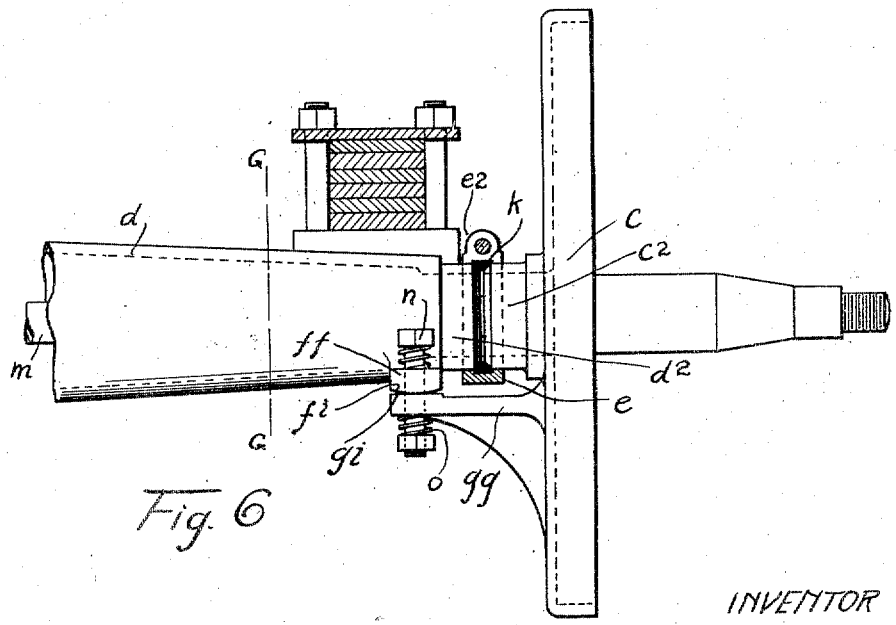

In Figs. 6 and 7 I have shown a modified construction in which a shelf $g\ g$ is formed upon the bracket $c$. Upon this shelf is a bearing surface $g\ i$, Fig. 6. This shelf is located directly under the end of the casing $d$ and such casing is provided with a bearing surface with lateral extensions $f\ f$ and this bearing surface is formed in the shape of a curve, as shown at $f\ i$, Fig. 6, and rests upon the bearing surface $g\ i$ to take up the torque transmitted by the casing $d$. There are bolts $n$ $n$ with interposed springs $o$ $o$ which construction holds the surfaces $g$ $i$ and $f$ $i$ yieldingly in contact.

What I claim is:

1. The combination of a load-carrying axle beam, end brackets secured to said beam, a jack-shaft casing carried solely by said end brackets, and means extending from said casing to one of said brackets for sustaining the torque of said casing.

2. The combination of a load-carrying axle beam, end brackets secured upon the end of the same, vehicle springs, said springs being rigidly connected to said brackets, a jack-shaft casing carried solely by said brackets, means extending between said casing and one of said brackets for absorbing the torque of said casing around the axis of said casing.

3. The combination of a load-carrying axle beam, end brackets secured to said beam, a jack-shaft casing carried solely by said end brackets, an oil proof joint uniting said casing to one of said brackets.

4. The combination of a load-carrying axle beam, end brackets secured to said beam, a jack-shaft casing carried solely by said end brackets, an oil proof joint uniting said casing to one of said brackets, said joint being adapted to permit a limited universal movement between the parts.

5. In an apparatus of the kind described, the combination of a load-carrying axle beam, end brackets secured upon said beam, a jack-shaft casing, a torque arm of thin material secured at one end to said casing and at the other end provided with a conical projection struck up from said material and having an aperture coaxial therewith, a bracket upon said beam being provided with a conical socket for receiving said projection, said projection fitting into said socket and a bolt having a conical surface adapted to fit into the conical surface of said projection and bind it in said socket.

6. The combination of a load-carrying axle beam, end brackets secured upon said beam, a jack-shaft casing, and means extending between said casing and one of said brackets adapted to resist the rotation of said casing about its longitudinal axis and to permit rotation of said casing about its transverse axis and a flexible connection between said jack-shaft casing and load carrying axle beam.

In testimony whereof, I sign this specification.

CECIL HAMELIN TAYLOR.